United States Patent
Härer (10) Patent No.: US 6,422,708 B2
(45) Date of Patent: Jul. 23, 2002

(54) EXTERIOR REARVIEW MIRROR FOR VEHICLES, IN PARTICULAR, MOTOR VEHICLES

(75) Inventor: Jörg Härer, Schorndorf (DE)

(73) Assignee: Reitter & Schefenacker GmbH & Co. KG, Esslingen (DE)

(*) Notice: Subject to any disclaimer, the term of this patent is extended or adjusted under 35 U.S.C. 154(b) by 0 days.

(21) Appl. No.: 09/849,063

(22) Filed: May 4, 2001

(30) Foreign Application Priority Data

May 11, 2000 (DE) .......................... 100 23 052

(51) Int. Cl.⁷ .............................. G02B 7/182
(52) U.S. Cl. ............... 359/879; 359/880; 359/838; 359/841; 359/850
(58) Field of Search ............... 359/879, 880, 359/838, 841, 850, 871, 872, 873, 877; 248/475.1, 477, 479

(56) References Cited

U.S. PATENT DOCUMENTS 4,951,912 A * 8/1990 Manzoni .................. 248/475.1
6,234,637 B1 * 5/2001 Juraschek ................... 359/871
6,315,421 B1 * 11/2001 Apfelbeck et al. .......... 359/871

* cited by examiner

*Primary Examiner*—Mohammad Sikder
(74) *Attorney, Agent, or Firm*—Gudrun E. Huckett

(57) ABSTRACT

An exterior rearview mirror for vehicles has a mirror base and a mirror head connected to the mirror base so as to be pivotable between a position of use and a parking position. A locking member locks the mirror head in the parking position. The mirror head has a counter locking member interacting in a locking position with the locking member for locking the mirror head in the parking position. A guide guides the counter locking member from the locking position into a release position when the mirror head is moved from the parking position into the position of use.

27 Claims, 8 Drawing Sheets

EXTERIOR REARVIEW MIRROR FOR VEHICLES, IN PARTICULAR, MOTOR VEHICLES

BACKGROUND OF THE INVENTION

1. Field of the Invention

The invention relates to an exterior rearview mirror for vehicles, in particular, for motor vehicles, comprising a mirror base on which a mirror head is supported to be pivotable between the position of use and a parking position.

2. Description of the Related Art

In known exterior rearview mirrors of this kind the mirror heads can be folded from a position of use in which they project transversely and outwardly from the vehicle, into a parking position in which they lie close to the vehicle. This adjustment is often connected with a relatively high mechanical expenditure and can be realized usually only with difficulty.

SUMMARY OF THE INVENTION

It is an object of the present invention to configure an exterior rearview mirror of this kind such that the mirror head can be adjusted and secured in a simple way.

In accordance with the present invention, this is achieved in that the mirror head is secured in the parking position by at least one locking member which cooperates with at least one counter locking member that is correlated with the mirror head and, upon pivoting of the mirror head into the position of use, is movable by a guide into a release position.

By means of the locking member the mirror head of the exterior rearview mirror is secured in its parking position. When the mirror head is pivoted back into the position of use, the counter locking member is moved by means of the guide into the release position so that the mirror head reaches reliably its position of use.

DESCRIPTION OF THE PREFERRED EMBODIMENTS

Figure 1:
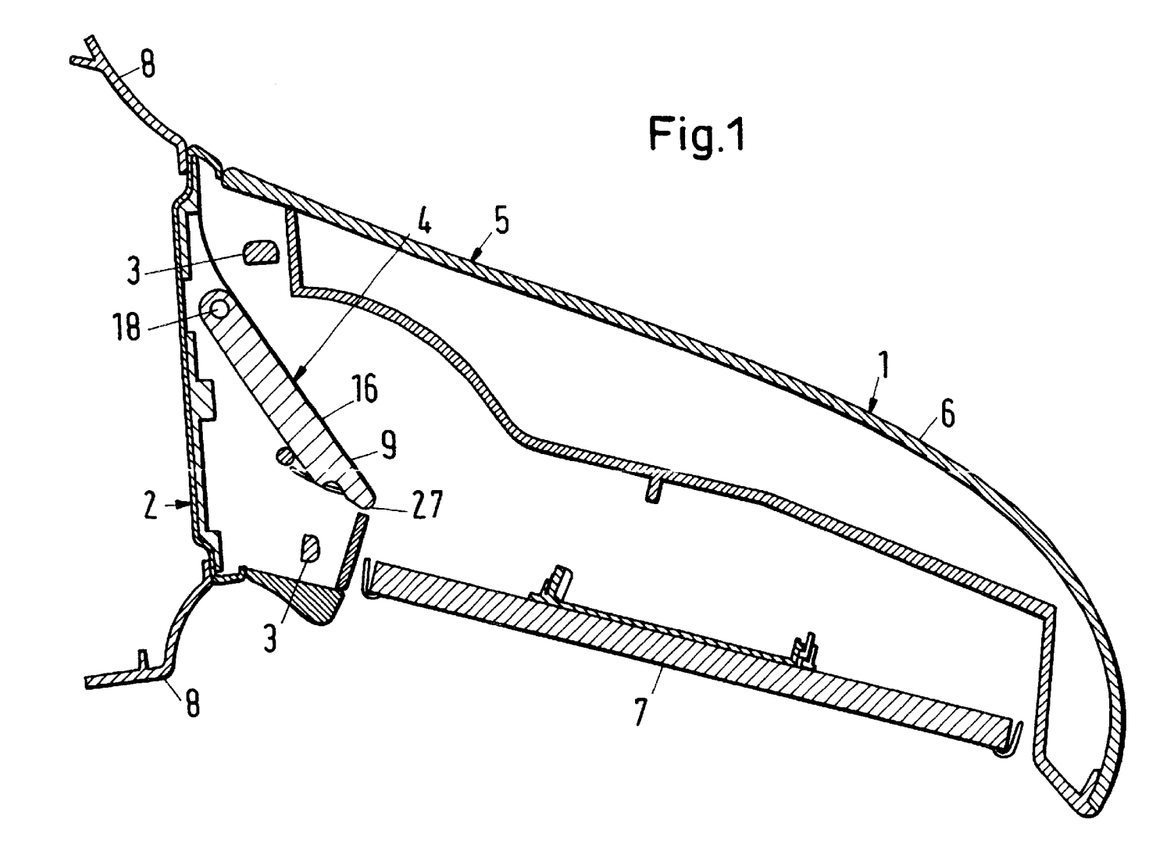
FIG. 1 is a longitudinal section of an exterior rearview mirror according to the invention with a mirror base to be fastened to the vehicle and having arranged thereat in a pivotable way an intermediate joint and a locking member provided with a spring.
Figure 2:
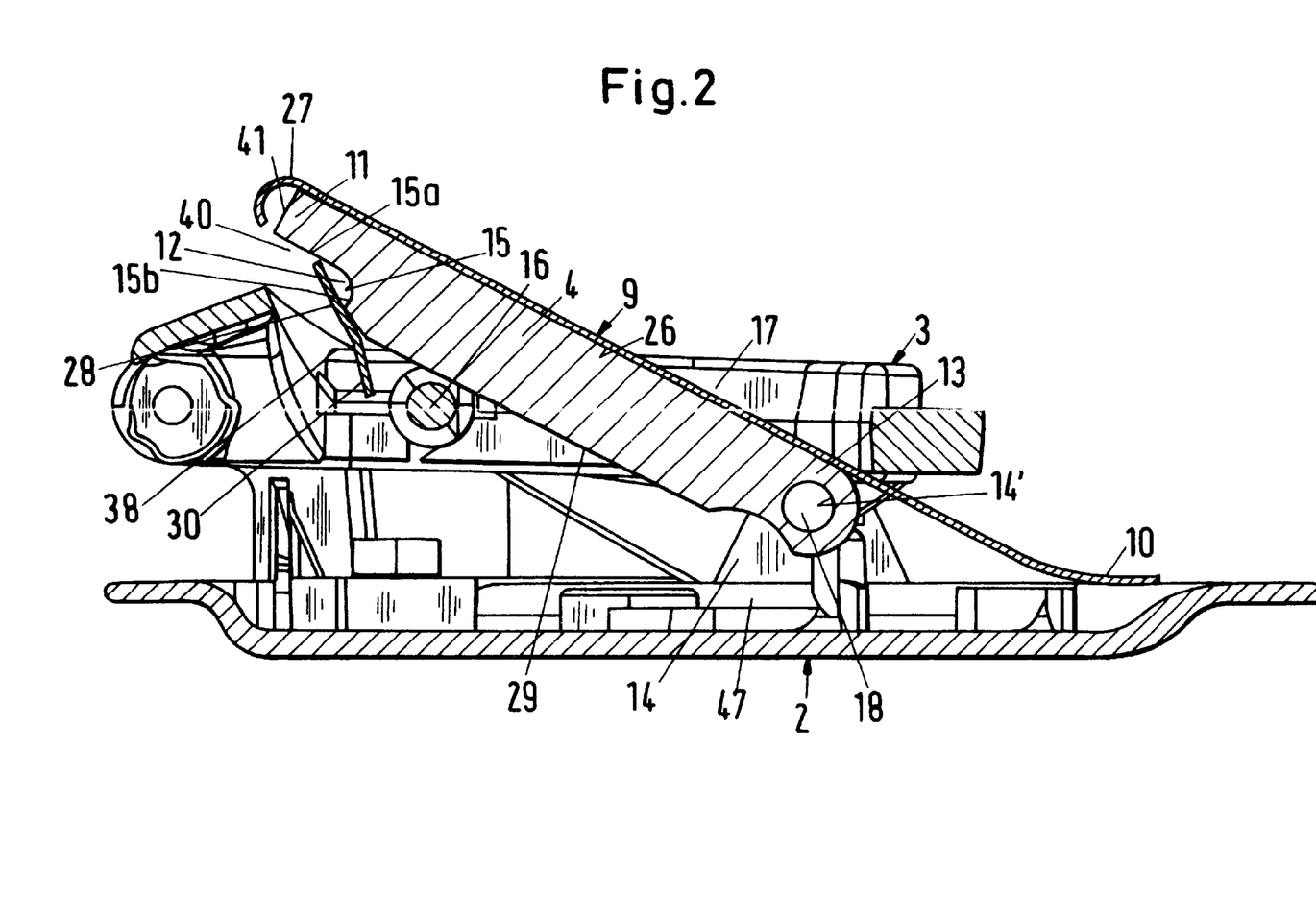
FIG. 2 is a longitudinal section and an end view of the mirror base, the intermediate joint, and the locking member with the spring according to FIG. 1 in a position the use of the mirror head and in an enlarged illustration.
Figure 3:
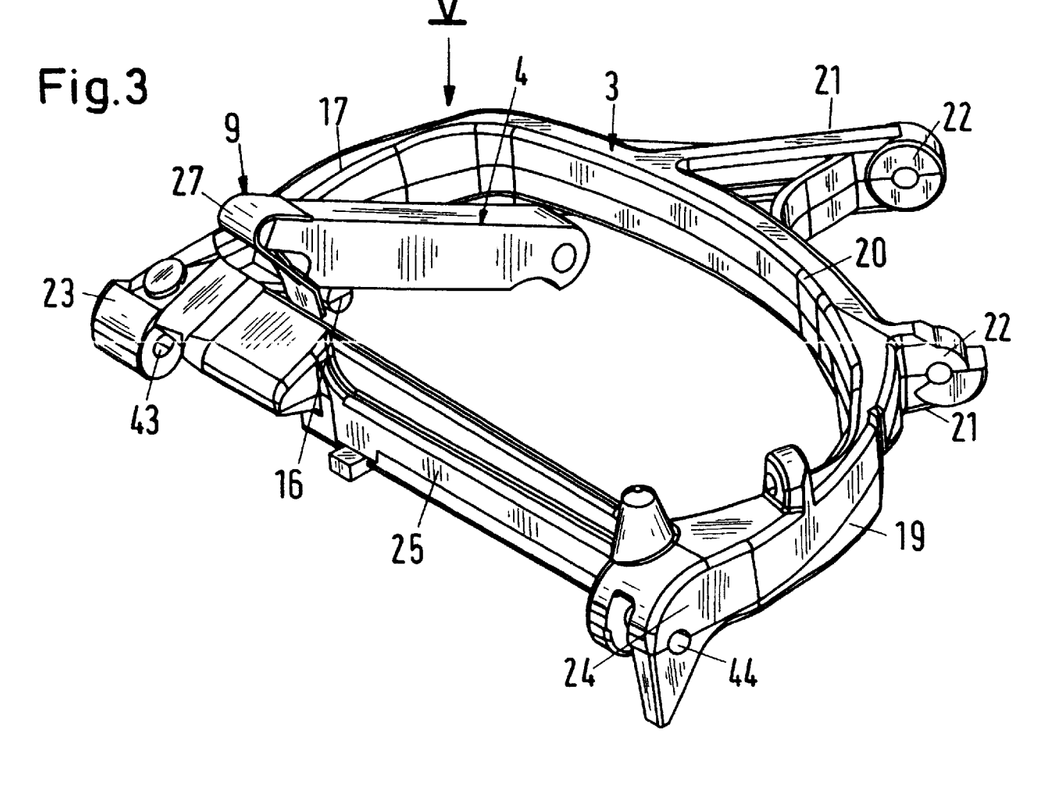
FIG. 3 is a perspective illustration of the intermediate joint with the locking member and the spring.

The exterior rearview mirror 1 illustrated in FIGS. 1 through 11 is provided for a motor vehicle of which only a part of the door 8 is illustrated. The mirror 1 is fastened on the motor vehicle by means of a mirror base 2. On the mirror base 2 an intermediate joint 3 as well as a locking member 4 are pivotably supported. The intermediate joint 3 supports the mirror head 5 with a housing 6 in which a mirror glass 7 is fastened. A spring 9 is arranged on the locking member 4. As illustrated in FIGS. 1 and 2, the spring 9 extends over the entire length of the locking member 4 and projects past it with its one end 10 with which it is fastened on the mirror base 2. Preferably, the spring 9 is glued to the locking member 4 and/or the mirror base 2. However, it can also be screwed on or fastened in any other way.

The locking member 4 is embodied as a single-arm lever whose free end 11 (FIG. 2) comprises a locking recess 12. With the other end 13 the locking member 4 is seated on a bearing axle 18 which is supported with its ends on two brackets 14 projecting from the mirror base 2. The locking member 4 is provided on its end 13 with a bearing opening 14'.

The locking recess 12 has an L-shaped bottom 15 which extends from the free end face 41 to the underside 29 of the locking member 4 positioned opposite the spring 9. The locking recess 12 is thus open toward the end face 41 and toward the underside 29 of the locking member 4. The two bottom areas 15a, 15b, positioned at a right angle to one another, have advantageously a continuously curved transition into one another. The locking member 4 rests with its underside 29 under the force of the spring 9 against a stop 16 of the intermediate joint 3 which stop 16 projects transversely from a leg 17 of the intermediate joint 3.

The intermediate joint 3 is formed as an essentially U-shaped bracket (FIG. 3) which comprises the leg 17 and the second leg 19 extending substantially parallel to the leg 17. The legs 17, 19 have a transition into one another in the form of a slightly outwardly curved transverse stay 20. Two stays 21 providing connectors project outwardly past the transverse stay 20 and have a bearing eye 22, respectively, for receiving a bearing axle (not illustrated) for the mirror head 5. The ends 23 and 24 of the legs 17 and 19 are connected to one another by a straight connecting stay 25. The stop 16 is positioned with minimal spacing behind the connecting stay 25. In comparison to the connecting stay 25 it is relatively short and projects only slightly past the inner side of the leg 17 in the direction toward the leg 19. The locking member 4 is positioned correspondingly with a minimal spacing adjacent to the leg 17. Its pivot axis 18 is positioned in the area underneath the transverse stay 20 of the intermediate joint 3. The connecting stay 25 and the bearing axle (not illustrated) for the mirror head 5, the bearing axle being positioned with its ends in the bearing eyes 22, are positioned at an acute angle to one another which opens in the direction toward the leg 17 of the intermediate joint 3.

The spring 9 is a leaf spring whose width is substantially identical to the width of the locking member 4. The spring 9 rests areally against the upper narrow longitudinal side 26 of the locking member 4. The spring surrounds with its free end portion 27 the free end 11 of the locking member 4 which is reduced in cross-section by the recess 12. The end portion 27 is approximately V-shaped with rounded tip and has a spring section in the form of a spring tongue 28 projecting into the recess 12 of the locking member 4. The spring tongue 28 in the embodiment is wider than the spring stay 36 of the end portion 27 which spring stay 36 has an insertion aid in the form of a guide bracket 30 on its free end that is angled at an obtuse angle. In the position of use of the external rearview mirror 1 (FIG. 2), the guide bracket 30 projects past the underside 29 of the locking member 4 and defines with it an acute angle of, for example, 45°.

Figures 4, 7:
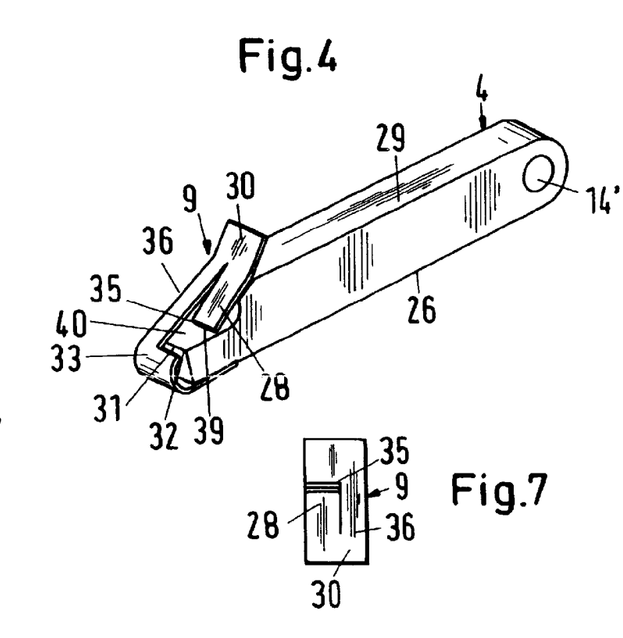
FIG. 4 shows the locking member with the spring according to FIG. 3 in a perspective illustration.
FIG. 7 shows the locking member and the spring in an end view according to arrow VII of FIG. 6.
Figure 5:
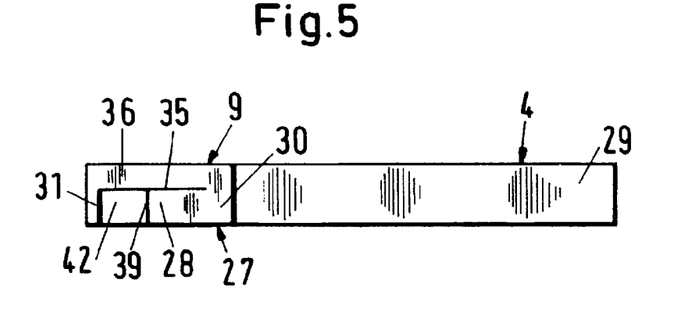
FIG. 5 shows the locking member according to FIG. 3 in a view according to arrow V in FIG. 3.
Figure 6:
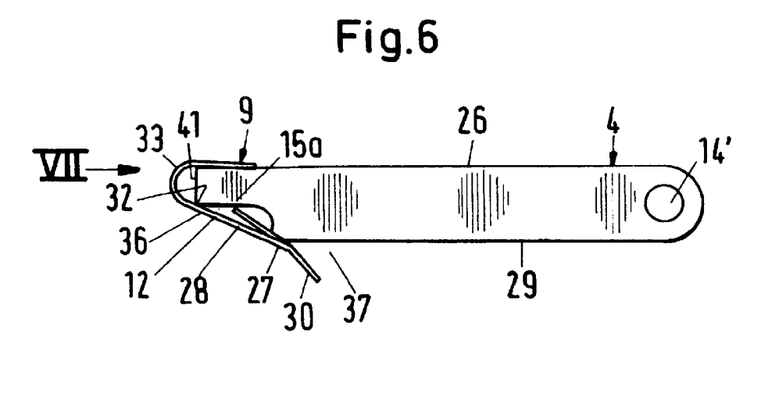
FIG. 6 shows the locking member according to FIG. 3 in a side view.

For forming the tongue 28, the end portion 27 of the spring 9 is slotted over a portion of its length such that an L-shaped cut 35 results (FIGS. 4, 5 and 7). The tongue 28 is positioned at a spacing from an edge 31 of an exit cutout 42 in the end portion 27 which edge extends transversely to the longitudinal direction of the end portion 27. The exit cutout 42 is open toward one longitudinal side of the end portion 27 of the spring 9 and is delimited at the other longitudinal side by a spring stay 36. The cut 35 extends up to the guide bracket 30 which has thus the same width as the spring 9 in the area external to the tongue 28 and the spring stay 36. The edge 31 of the cutout 42 is positioned approximately at the transition from the spring stay 36 into the curved intermediate part 33 of the spring 9 positioned in front of the end face 41 of the locking member 4.

The spring tongue 28 is positioned on an end face edge 32 of the locking member 4 which is positioned between the end face 41 of the locking member 4 and the bottom 15 of the locking recess 12. The bottom portion 15a is positioned advantageously parallel to the upper side and underside 26, 29 of the locking member 4. The spring tongue 28 is bent out of the plane of the spring stay 36 in a direction opposite to the guide bracket 30 so that, as illustrated in FIG. 4, it projects into the recess 12 of the locking member 4. The tongue 28 defines with the underside 29 of the locking member 4 an acute angle of approximately 450.

Figure 8:
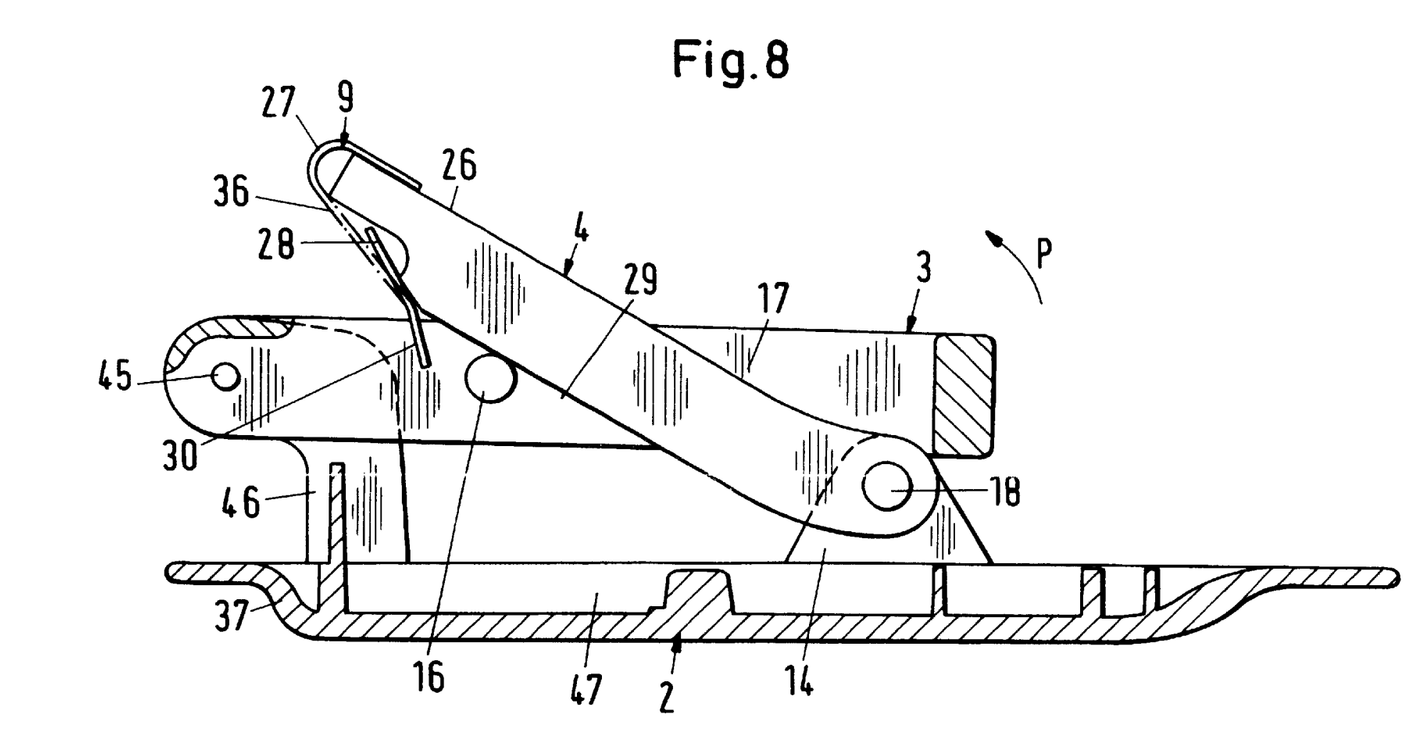
FIG. 8 shows an illustration similar to that of FIG. 2 but with the locking member in a side view.

The locking member 4 serves for locking the mirror head 5 in its parking position. The mirror head 5 can be pivoted from the position of use illustrated in FIG. 1 in the travel direction of the motor vehicle to the rear into the parking position in which it is approximately parallel to the motor vehicle door 8 (FIGS. 2, 8). In the parking position, the mirror head 5 is locked via its intermediate joint 3 by the locking member 4.

As is shown in FIG. 1, the bearing or pivot axle 18 of the locking member 4 extends approximately vertically. The legs 17, 19 of the intermediate joint 3 are provided at their free ends 23, 24 with bearing openings 43, 44 for an axle 45 (FIG. 8) with which the intermediate joint 3 is connected to the stays 46 which project transversely from the mirror base 2. The pivot axles 18, 46 of the locking member 4 and of the intermediate joint 3 are positioned parallel to one another. The axle 46 has such a spacing from the mirror base 2 that the intermediate joint 3 can be pivoted unimpaired when the mirror head 5 is pivoted from the position of use into the folded parking position and vice versa.

In the position of use of the mirror head 5, the locking member 4 rests with the underside 29 facing the mirror base 2 against the bolt-shaped stop 16 of the intermediate joint 3 (FIGS. 2 and 8). In this position, the intermediate joint 3 is positioned approximately parallel to the contact part 47 (FIG. 8) of the mirror base 2 which contact part is fastened on the motor vehicle door 8. The locking member 4 extends from its pivot axle 18 at an acute angle to the intermediate joint 3. The guide bracket 30 of the spring 9 which projects at an acute angle past the underside 29 of the locking member 4 has a spacing from the stop 16. The guide bracket 30 forms together with the underside 29 of the locking member 4 an insertion opening 37 which widens in the direction toward the stop 16.

Figure 9:
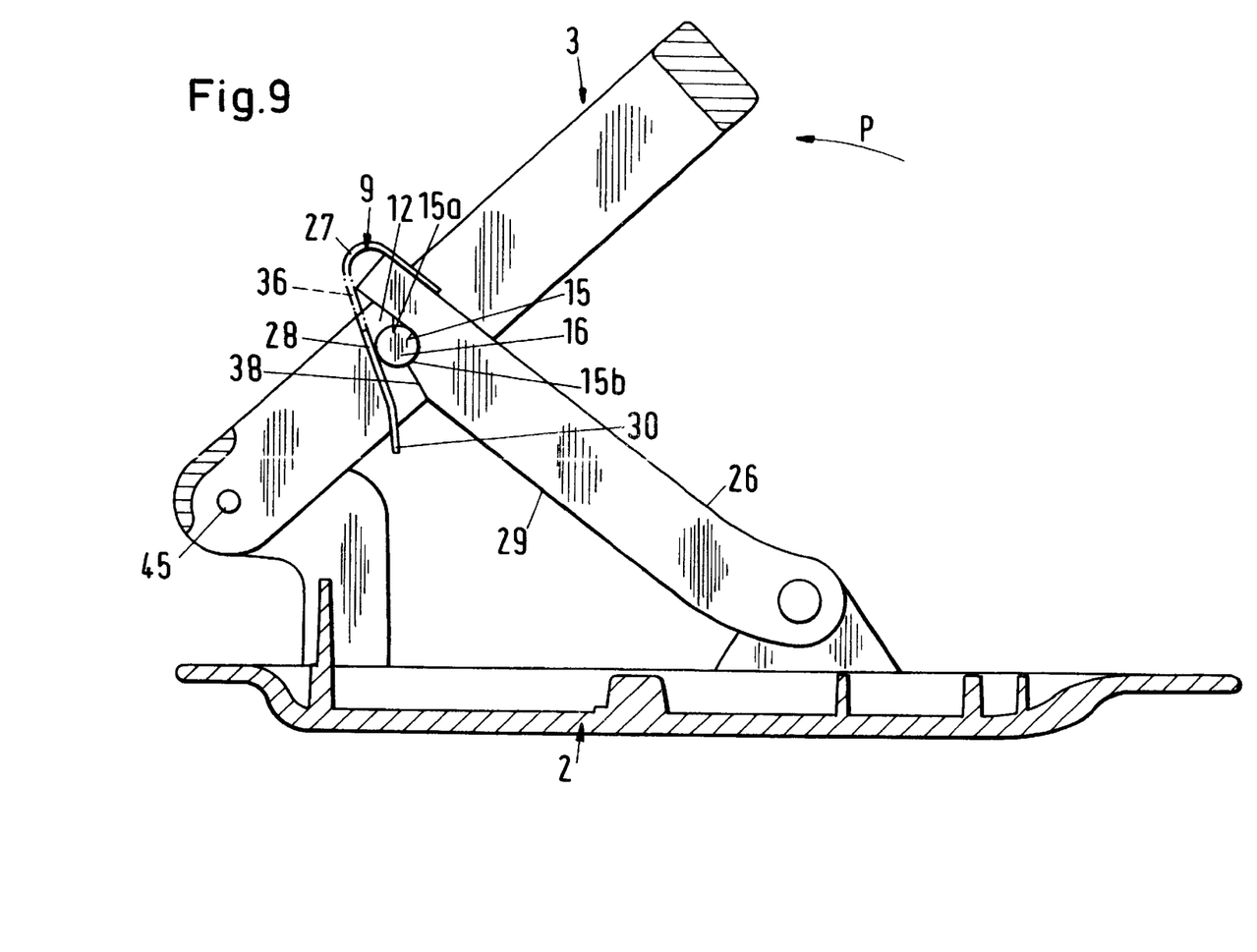
FIG. 9 is an illustration corresponding to FIG. 8 with the intermediate joint in the locking position.

When the mirror head 5 is pivoted into the parking position, which can be carried out by a motor or by hand, the intermediate joint 3 pivots about the axle 45 away from the mirror base 2 in the direction of arrow P in FIG. 9. Since the stop 16 is part of the intermediate joint 3, it is also entrained in the direction of arrow P. Since the stop 16 advantageously has a circular cross-section, it glides easily along the underside 29 of the locking member 4. This causes it to be pivoted in the opposite direction about the axle 18. The stop 16 reaches the insertion opening 37 and bends the guide bracket 30 away elastically. As soon as the stop 16 reaches the spring tongue 28, the latter is elastically bent away. As illustrated in FIG. 9, it is thereby bent into the plane of the spring stay 36. The underside 29 of the locking member 4 has a transition, at a minimal spacing from the locking recess 12, into a slant 38 which extends to the locking recess 12. The slant 38 is arranged such that it is positioned approximately parallel to the spring tongue 28 when the latter is elastically deformed by the stop 16. This ensures that the end portion 27 of the spring 9 must not be overly strongly elastically deformed. The locking member 4 is forced always into contact on the stop 16 by the spring 9.

As soon as the stop 16 has reached its locking position in the locking recess 12, the mirror head 5 has reached its parking position. The bottom 15 of the locking recess 12 is advantageously curved at the transition between the bottom portions 15a, 15b such that the stop 16 rests areally against the bottom 15.

In this position the spring tongue 28 engages with elastic tension the stop 16 so that the locking member 4 and the intermediate joint 3, and thus the mirror head secured thereat, are securely locked with one another. This secure locking is further reinforced in that the spring tongue 28 and the part of the spring 9 on the other side of the locking member 4 exert oppositely directed forces.

Figure 10:
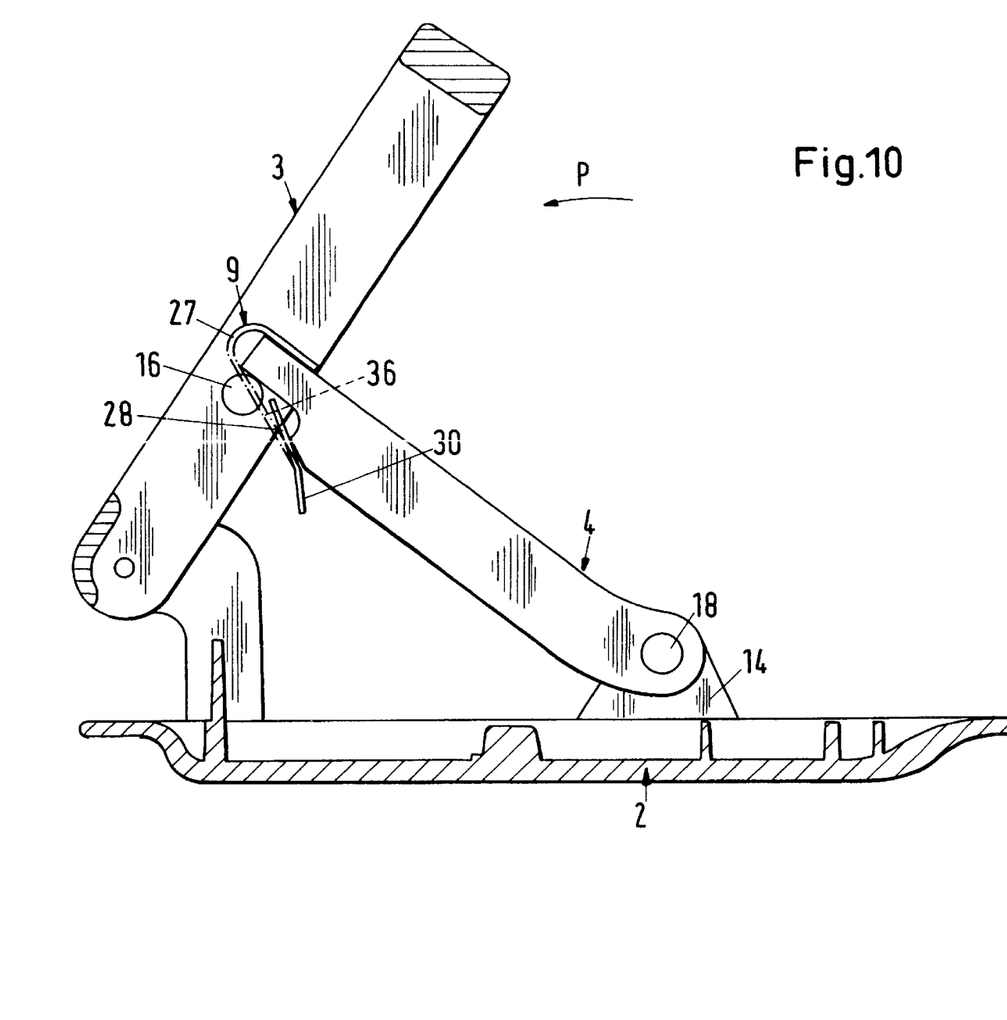
FIG. 10 is an illustration according to FIG. 8 with the intermediate joint in a position in which it is pivoted via the locking position in the direction toward a position of non-use.
Figure 11:
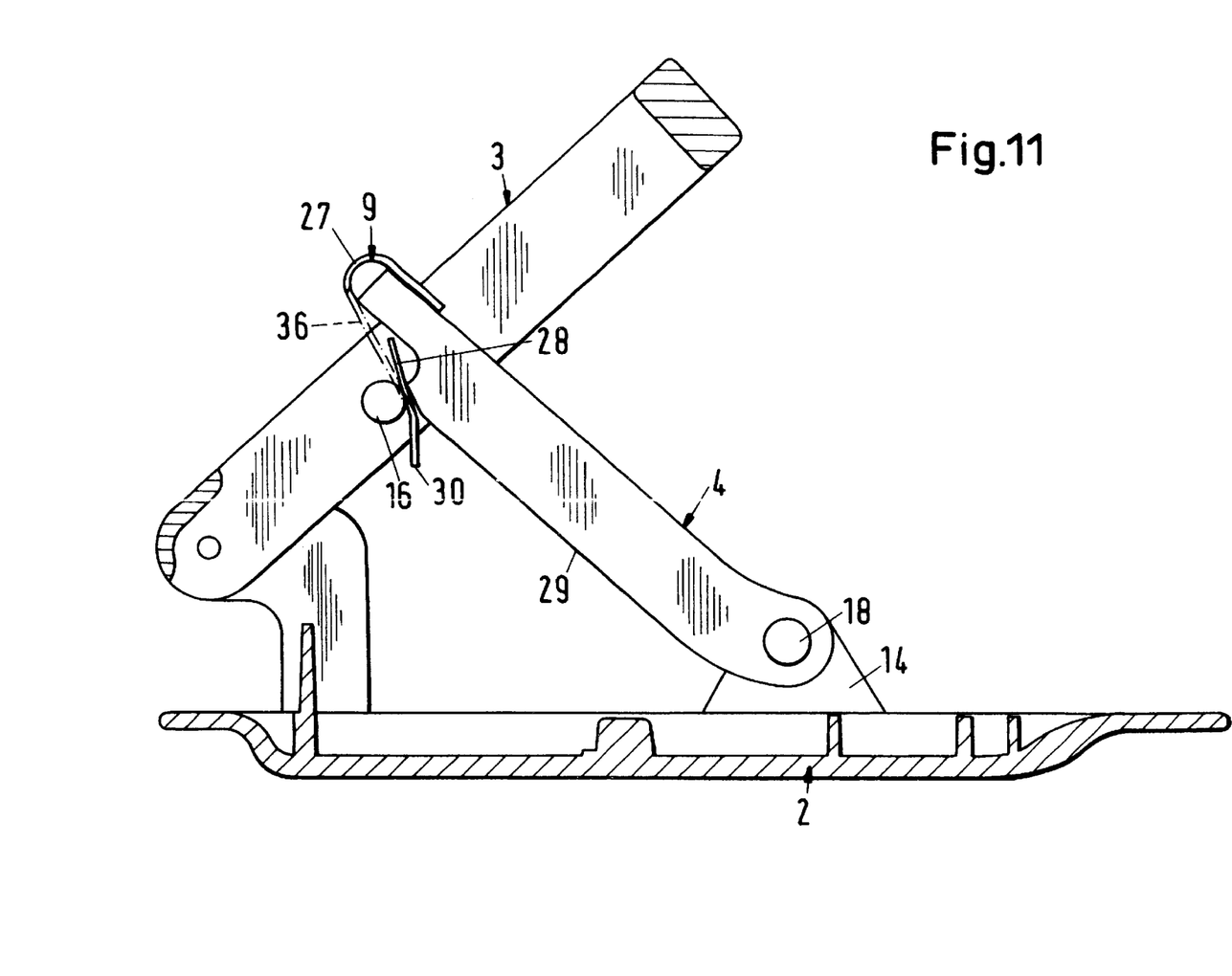
FIG. 11 is an illustration corresponding to FIG. 8 with the intermediate joint in an intermediate position during return pivoting of the mirror head into the position of use.

When the mirror head 5 is to be folded from the parking position back into the position of use, the intermediate joint 3 and thus the mirror head 5 are slightly pivoted farther in the direction toward the motor vehicle door 8 (FIG. 10). The stop 16 glides then along the bottom 15 of the locking recess 12 until it reaches the cutout 42 (FIG. 5) in the end portion 27 of the spring 9. The spacing between the edge 31 of the exit cutout 42 extending transversely to the longitudinal direction of the spring 9 and the parallel end face 39 of the spring tongue 28 is so great that the stop 16 can move out through the cutout 42, into which it is guided by the underside of the spring tongue 28, so as to return into its release position. FIG. 10 shows the situation in which the stop 16 has just exited through the cutout 42.

The spring tongue 28 springs back immediately into its initial position as soon as the stop 16 has been released from the spring tongue 28 (FIG. 10). The spring tongue 28 projects into close proximity to the bottom 15 of the locking recess 12. The intermediate joint 3 can now be pivoted back counter to the direction of arrow P. The stop 16 then rests against the spring tongue 28 (FIG. 11) on which the stop 16 glides when the intermediate joint 3 pivots back. Via the spring tongue 28, providing again a guiding action, the stop 16 reaches the underside 29 of the locking member 4 which is always secured against the stop 16 by the force of the spring 9. In this way, the intermediate joint 43 and the locking member 4 pivot in opposite directions relative to one another into the initial position according to FIG. 8 in which the mirror head 5 has reached its position of use. It is secured in a manner known in the art on the mirror base 2 by a snap connection such that the mirror head 5 can be folded in the described manner into the parking position or forwardly in the travel direction when impacted upon.

While specific embodiments of the invention have been shown and described in detail to illustrate the inventive principles, it will be understood that the invention may be embodied otherwise without departing from such principles.

What is claimed is:

1. An exterior rearview mirror for vehicles, the exterior rearview mirror comprising:
    a mirror base (2);
    a mirror head (5) connected to said mirror base (2) so as to be pivotable between a viewing position and a parking position;
    a locking member (4) having a locking recess (12) configured to lock said mirror head (5) in said parking position;
    said mirror head (5) comprising a counter locking member (16) configured to interact in a locking position with said locking recess (12) of said locking member (4) for locking said mirror head (5) in said parking position;
    a guide (28) configured to guide said counter locking member (16) from said locking position into a release position when said mirror head (5) is moved from said parking position into said viewing position;
    wherein said locking member (4) has a spring (9) with a spring section projecting into said locking recess (12), wherein said spring section forms said guide (28).

2. The exterior rearview mirror according to claim 1, wherein said locking member (4) is bar-shaped and has a rectangular cross-section.

3. The exterior rearview mirror according to claim 1, wherein said locking member (4) is pivotably supported on said mirror base (2).

4. The exterior rearview mirror according to claim 1, wherein said mirror head (5) further comprises an intermediate joint (3) connecting said mirror head (5) to said mirror base (2), wherein said counter locking member (16) is connected to said intermediate joint (3).

5. The exterior rearview mirror according to claim 4, wherein said mirror base (2) comprises an axle (18) and wherein said locking member (4) has a first end (13) supported on said axle (18).

6. The exterior rearview mirror according to claim 5, wherein said locking member (4) has a second end (11) and wherein said second end (11) has a locking recess (12) configured to receive said counter locking member (16).

7. The exterior rearview mirror according to claim 6, wherein said locking member (4) is configured to be spring-loaded in a direction toward said intermediate joint (3).

8. The exterior rearview mirror according to claim 7, further comprising a spring (9) connected to said mirror base (2) and resting against said locking member (4) over an entire length of said locking member (4).

9. The exterior rearview mirror according to claim 8, wherein said spring (9) has a first end (10) projecting past said first end (13) of said locking member (4), wherein said first end (10) of said spring (9) is fastened to said mirror base (2).

10. The exterior rearview mirror according to claim 9, wherein said spring (9) has an end portion (27) and wherein said end portion (27) projects past said locking recess (12).

11. The exterior rearview mirror according to claim 8, wherein said spring (9) is a leaf spring.

12. The exterior rearview mirror according to claim 8, wherein said spring (9) covers said second end of said locking member (4).

13. The exterior rearview mirror according to claim 11, wherein said second end (11) is a free end on which said locking recess (12) is provided.

14. The exterior rearview mirror according to claim 10, wherein said end portion (27) of said spring (9) has a spring section projecting into said locking recess (12), wherein said spring section forms said guide (28).

15. The exterior rearview mirror according to claim 14, comprising at least one insertion aid (30) located in a movement path of said counter locking member (16) when said mirror head (5) is pivoted into said parking position.

16. The exterior rearview mirror according to claim 15, wherein said end portion (27) has an angled end and wherein said angled end forms said insertion aid (30).

17. The exterior rearview mirror according to claim 15, wherein said insertion aid (30) delimits an insertion opening (37) for said counter locking element (16), wherein said insertion opening (37) widens in a direction counter to the movement path of said counter locking member (16).

18. The exterior rearview mirror according to claim 14, wherein said end portion (27) of said spring (9) has an exit cutout (42) configured to allow said counter locking member (16) to exit from said locking recess (12), wherein said exit cutout (42) is positioned adjacent to said guide (28).

19. The exterior rearview mirror according to claim 10, wherein said guide (28) is formed by bending said end portion (27) of said spring (9).

20. The exterior rearview mirror according to claim 17, wherein said insertion opening (37) is delimited by a portion of a sidewall (29) of said locking member (4).

21. The exterior rearview mirror according to claim 20, wherein said locking member (4) has a slant (38) connecting said sidewall (29) to a bottom of said locking recess (12).

22. The exterior rearview mirror according to claim 4, wherein said intermediate joint (3) is U-shaped with a first leg (17) and a second leg (19), wherein said locking member (4) is positioned adjacent to said first leg (17).

23. The exterior rearview mirror according to claim 22, wherein said first leg (17) has a inner side facing said second leg (19), wherein said locking member (16) projects past said inner side of said leg (17).

24. The exterior rearview mirror according to claim 4, wherein said locking member (4) and said intermediate joint (3) are pivotable toward one another.

25. The exterior rearview mirror according to claim 22, wherein said intermediate joint (3) has a transverse stay (20) connecting said first and second legs (17,19), wherein said transverse stay (21) has outwardly projecting connectors (21) configured to connect said mirror head (5) to said intermediate joint (3).

26. The exterior rearview mirror according to claim 25, wherein said intermediate joint (3) comprises a connecting stay (25) connecting ends of said first and second legs (17, 18) remote from said transverse stay to one another.

27. The exterior rearview mirror according to claim 1, wherein said counter locking member (16) is spring-loaded against said locking member (4) when said mirror head (5) is in said position of use.

* * * * *